(12) United States Patent
Sirpal (10) Patent No.: US 10,331,300 B2
(45) Date of Patent: Jun. 25, 2019

(54) DEVICE AND METHODS FOR CONTROL INCLUDING PRESENTATION OF A LIST OF SELECTABLE DISPLAY ELEMENTS

(71) Applicants: Jamdeo Canada Ltd., Oakville (CA); Qingdao Hisense Electronics Co., Ltd., Qingdao, Shandong (CN); Hisense USA CORP., Suwanee, GA (US); Hisense International Co., Ltd., Qingdao, P.R.C. (CN)

(72) Inventor: Sanjiv Sirpal, Oakville (CA)

(73) Assignee: Qingdao Hisense Electronics Co., Ltd., Qingdao (CN)

(*) Notice: Subject to any disclaimer, the term of this patent is extended or adjusted under 35 U.S.C. 154(b) by 224 days.

(21) Appl. No.: 15/169,634

(22) Filed: May 31, 2016

(65) Prior Publication Data

US 2016/0378278 A1   Dec. 29, 2016

Related U.S. Application Data (60) Provisional application No. 62/183,613, filed on Jun. 23, 2015, provisional application No. 62/184,476, filed on Jun. 25, 2015.

(51) Int. Cl.
*G06F 3/0481* (2013.01)
*G06F 3/0482* (2013.01)
(Continued)

(52) U.S. Cl.
CPC .......... *G06F 3/0482* (2013.01); *G06F 3/0481* (2013.01); *G06F 3/04883* (2013.01); *G06F 16/316* (2019.01); *G06F 16/35* (2019.01); *H04M 1/72583* (2013.01); *H04N 5/23216* (2013.01); *G06F 3/017* (2013.01); *G06F 3/0484* (2013.01); *G06F 3/0485* (2013.01); *G06F 3/0488* (2013.01); *G06F 3/04817* (2013.01); *G06F 3/04842* (2013.01); *G06F 3/04847* (2013.01); *G06T 11/60* (2013.01); *G06T 2200/24* (2013.01); *H04B 1/3833* (2013.01); *H04L 51/04* (2013.01); *H04M 2250/22* (2013.01)

(58) Field of Classification Search
CPC .... G06F 3/0482; G06F 3/0485; G06F 3/0488; G06F 17/30619; G06F 17/30705
See application file for complete search history.

(56) References Cited

U.S. PATENT DOCUMENTS

| | | | |
|---|---|---|---|
| 2006/0218112 A1* | 9/2006 | Van De Sluis | G06F 3/033 |
| 2007/0150830 A1* | 6/2007 | Ording | G06F 3/0481 715/784 |
| 2012/0030614 A1* | 2/2012 | Tuli | G06F 3/04855 715/786 |

* cited by examiner

*Primary Examiner* — Rinna Yi
(74) *Attorney, Agent, or Firm* — Gordon & Rees LLP

(57) ABSTRACT

The present disclosure relates to methods and devices for device control. In one embodiment, a method for device control including presentation of a selectable display element includes determining activity for each of a plurality of list elements of the device and determining a display format for a selectable display element, wherein the selectable display element is configured for presentation associated with the plurality of display elements. The method may also include presenting at least a portion of the selectable display element on a display of the device, wherein at least one list element is presented in association with the portion of the selectable display element. Another embodiment is directed to a device configured to present a selectable display element for control.

18 Claims, 4 Drawing Sheets

(51) Int. Cl.
  *G06F 16/35* (2019.01)
  *G06F 16/31* (2019.01)
  *G06F 3/0488* (2013.01)
  *H04N 5/232* (2006.01)
  *H04M 1/725* (2006.01)
  *G06F 3/0485* (2013.01)
  *G06F 3/0484* (2013.01)
  *G06T 11/60* (2006.01)
  *H04L 12/58* (2006.01)
  *G06F 3/01* (2006.01)
  *H04B 1/3827* (2015.01)

DEVICE AND METHODS FOR CONTROL INCLUDING PRESENTATION OF A LIST OF SELECTABLE DISPLAY ELEMENTS

CROSS-REFERENCE TO RELATED APPLICATIONS

This application claims priority to U.S. Provisional Application No. 62/183,613 titled SYSTEM AND METHODS FOR A USER INTERFACE AND DEVICE OPERATION filed on Jun. 23, 2015, and U.S. Provisional Application No. 62/184,476 titled SYSTEM AND METHODS FOR A USER INTERFACE AND DEVICE OPERATION filed on Jun. 25, 2015, the content of which is expressly incorporated by reference in its entirety.

FIELD

The present disclosure relates to electronic devices and device control, and more particularly to methods and devices configured for presentation of a selectable display element.

BACKGROUND

Mobile devices and personal communication devices are generally used for multiple purposes. These devices are often configured with particular forms of control, such as the inclusion of hard and soft buttons. With development of applications and device capabilities, there exists a need for device configurations that improve performance and resolve drawbacks of the conventional configurations. One area where improvements are needed for devices relates to selection of a user interface.

Regarding conventional methods, existing processes for presentation or display of elements often require presenting a portion of elements at a time due to screen size. There exists a need to provide configurations which allow for improved access and allow for greater control of device operation.

BRIEF SUMMARY OF THE EMBODIMENTS

Disclosed and claimed herein are methods and devices for control including presentation of a selectable display element. One embodiment is directed to a method including determining, by a device, activity for each of a plurality of list elements of the device, and determining, by the device, a display format for a selectable display element, wherein the selectable display element is configured for presentation associated with the plurality of display elements. The method also includes presenting, by the device, at least a portion of the selectable display element on a display of the device, wherein at least one list element is presented in association with the portion of the selectable display element.

In one embodiment, the activity for each of a plurality of list elements is determined based on at least one of number of times accessed, duration of use, and interaction with each of the plurality of list elements.

In one embodiment, the plurality of list elements includes at least one of contact, application, social media profile, media title, image data, and website.

In one embodiment, the selectable display element includes a plurality of graphical elements identifying by at least one of shape, size, color, and appearance activity for the plurality of list elements.

In one embodiment, the display format for the selectable display element defines a graphical segment identifying list elements with greater activity by increased dimension and area relative to list elements with lesser activity by decrease dimension and area.

In one embodiment, the display format for the selectable display element defines a scrollable element presented in association with a scrolling direction of the plurality of list elements.

In one embodiment, the method also includes detecting a selection of the selectable display element and updating the presentation of the selectable display element based on the selection.

In one embodiment, the method also includes detecting a selection of the selectable display element and controlling a function of the device based on the selection and a list element associated with the selection.

In one embodiment, the method also includes detecting activity with one or more of the plurality of list elements and updating the display format for the selectable display element.

In one embodiment, the method also includes determining index elements for the plurality of list elements and presenting the selectable display element to include at least a portion of the index elements.

Another embodiment is directed to a device including memory and a controller coupled to the memory. The controller is configured to determine activity for each of a plurality of list elements of the device and determine a display format for a selectable display element, wherein the selectable display element is configured for presentation associated with the plurality of display elements. The controller is also configured to present at least a portion of the selectable display element on a display of the device, wherein at least one list element is presented in association with the portion of the selectable display element.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

One aspect of the disclosure is directed to controlling a device and presentation of a selectable display element. In one embodiment, a device including a user interface is configured to present a selectable display element in association with presentation of user interface elements of a device. In particular, elements of the user interface can relate to objects or data entities that are managed or presented by the device. In one embodiment, elements of the user interface include applications, contacts, contact data elements, media files, social media profiles, image data, websites, etc. Elements of the user interface can be list elements, such that presentation of the elements by the user interface is in a list format. In one embodiment, the selectable display element is presented in conjunction with list elements. Activity associated with elements managed or presented by the device, including list and non-list elements, is tracked by the device to present the selectable display element in certain embodiments.

Methods and device configurations are provided for presenting a selectable display element. In one embodiment, the selectable display element represents a level of activity and/or interaction associated with the elements of the device. By way of example, elements may relate to contacts presented by the device and the selectable display element can present a graphical representation for one or more of the amount of interaction with each contact, number of times the contact was selected, number of times the contact was used in communication and unread/pending communications associated with the contact. With respect to applications, the selectable device element may be presented to identify amount of use and/or interaction with an application, importance, etc. The selectable display element may be presented with one or more types of elements presented by a user interface of the device.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Figure 1A:
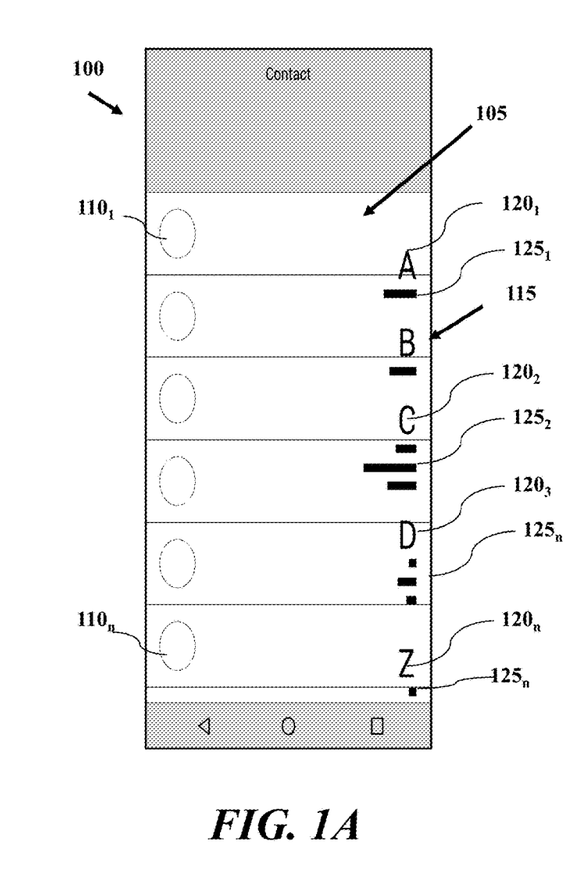
FIG. 1A depicts a graphical representation of a device display including a selectable display element according to one or more embodiments.
Figure 1B:
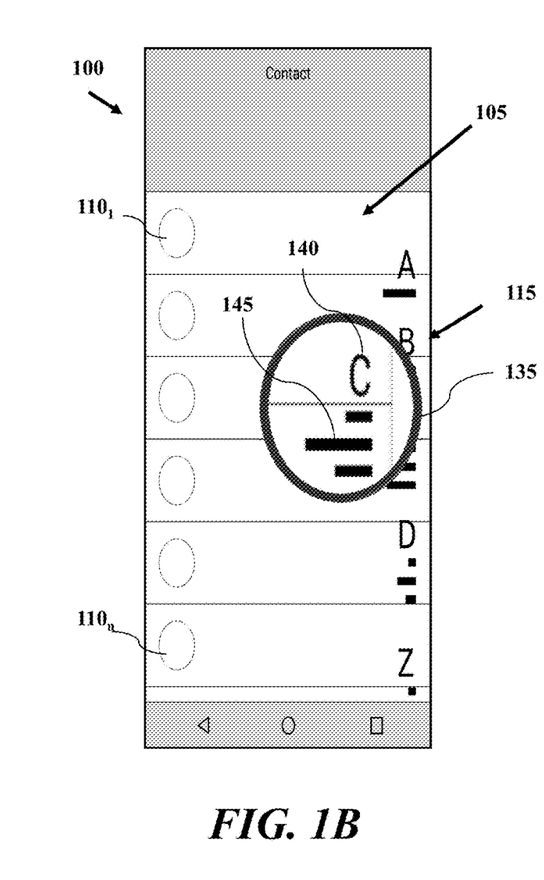
FIG. 1B depicts a graphical representation of a device display including a selectable display element according to one or more embodiments.

Referring now to the figures, FIGS. 1A-1B depict graphical representations of a device display including a selectable display element according to one or more embodiments.

In FIG. 1A, device 100 includes a display of a user interface 105. User interface 105 may relate to a device control window, an application window, and display format of the device in general. According to one embodiment, user interface 105 includes presentation of graphical elements for elements $110_{1-n}$. Elements $110_{1-n}$ are displayed in a list according to one or more embodiments. According to another embodiment, selectable display element 115 is presented in user interface 105 in associated with elements $110_{1-n}$. According to one embodiment, presentation format for selectable display element 115 is based on activity determined by the device 100 for elements $110_{1-n}$. According to another embodiment, only a portion of selectable display element 115 is presented in FIG. 1A, in the event only a portion of elements $110_{1-n}$ are displayed in user interface 105. Selectable display element 115 is configured to be scrollable based on an input to device 100, such as touch contact to user interface 105. Selectable display element 115 is configured for selection by a touch contact on a display associated with a device, wherein the point of detection of the selectable display element 115 is collocated with a display location to allow for selection of a particular point, navigation (e.g., scrolling) and/or updating (e.g., enlarging, presentation of magnified view, etc.) of the selectable display element 115.

Selectable display element 115 can allow for visualization of elements of user interface 105. In that fashion, elements, such as elements $110_{1-n}$ may be navigated to by inputs to and/or manipulation of selectable display element 115. Selectable display element 115 may provide a heat map of interaction with elements. By way of example, when elements $110_{1-n}$ relate to contacts, selectable display element 115 may indicated a visualization of the most contacted contacts.

According to another embodiment, device 100 may format selectable display element 115. In FIG. 1A, selectable display element 115 is presented to include reference elements $120_{1-n}$ and bar elements $125_{1-n}$. Reference elements $120_{1-n}$ relate to reference characters for categorizing and arranging elements $110_{1-n}$. As shown in FIG. 1A, reference elements $120_{1-n}$ relates to an alphabetical listing. Bar elements $125_{1-n}$ are a plurality of visual elements, the dimension/size (e.g., height, width, thickness, etc.) represent the amount of activity with elements $110_{1-n}$. According to one embodiment, the number of bar elements $125_{1-n}$ presented with selectable display element 115 is based on the number of elements $110_{1-n}$ associated with each reference element.

According to one embodiment, selectable display element 115 provides to contact list navigation, allows for optimized layout on a screen of a device (e.g., large screen phones) and provides access and browsing of device contacts. Selectable display element 115 can present a heat map, or visualization, for the most contacted profiles, allow fast navigation to frequent contacts and provide a preview contact details during interaction (e.g., swipe over, touch, etc.).

According to one embodiment, interaction with selectable display element 115 can be detected by device 100 and trigger an updated presentation of selectable display element 115. Interaction includes touch and/or contact with the display of the selectable display element 115. FIG. 1B depicts a graphical representation of a device display including a selectable display element according to one or more embodiments. Device 100 is configured to present user interface 105 with elements $110_{1-n}$ and selectable display element 115 including magnified window 135. According to one embodiment, user interaction with selectable display element 115 such as a prolonged contact, tap, etc. will trigger magnified window 135 including an enlarged reference character 140 and one or more bar elements 145 based on the location associated with the input command of selectable display element 115. Magnified window 135 may be displayed for a predetermined period of time to allow for greater detail and/or control of a selected bar element 145.

According to one embodiment, selections of selectable display element 115 in user interface 105, such as bar elements $125_{1-n}$ or bar element 145 will be detected by device 100 and can result in a selection of the element $110_{1-n}$ associated with the selected bar element. In that fashion, the device can be controlled based on interaction with selectable display element 115. By providing control with selectable display element 115, fast navigation to frequently visited elements can be provided. Selectable display element 115 is configured to provide a control feature to navigate electronic files (e.g., contacts, media files, applications, etc.) in with dynamic control visualization.

In one embodiment, device 100 relates to a computing device, such as a personal communication device, media player, and computing device having a display.

Figure 2:
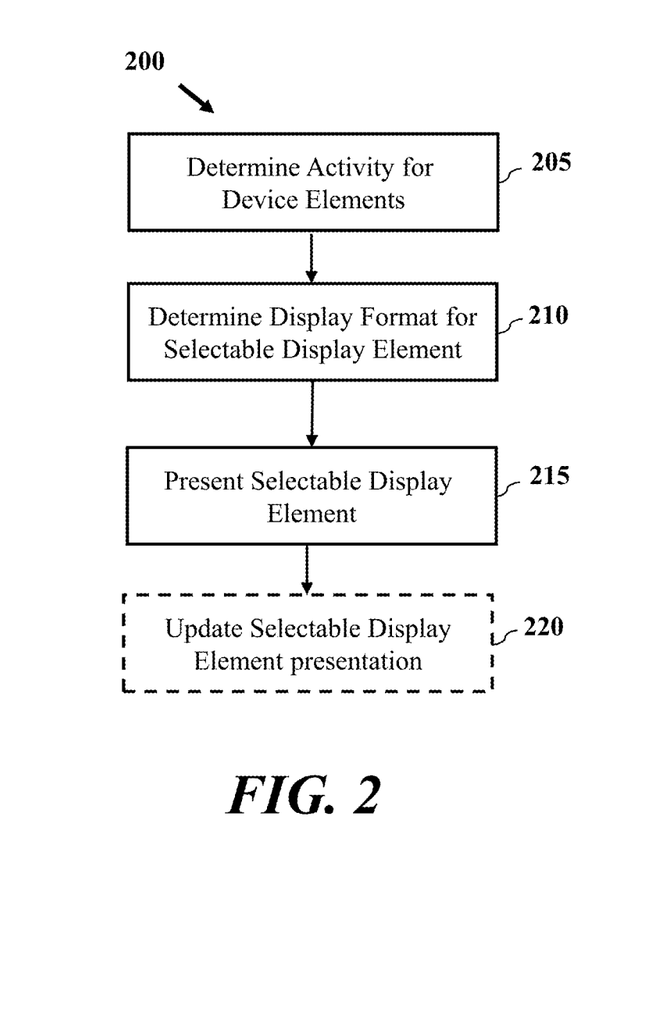
FIG. 2 depicts a process for presenting a selectable display element according to one or more embodiments.

FIG. 2 depicts a process for presenting a selectable display element (e.g., selectable display element 115) according to one or more embodiments. According to one embodiment, process 200 is executed by a device (e.g., device 100) to provide one or more control elements by way of a display of the device. Process 200 includes determining activity for each of a plurality of list elements of the device at block 205. In one embodiment, activity is determined for each of a plurality of list elements based on at least one of number of times accessed, duration of use, and interaction with each of the plurality of list elements. Activity can be determined individually and periodically updated. In certain embodiments, a device controller monitors and tracks device inputs and selections to track activity. Applications and core systems of the device may be configured to log interactions, such as device selections and corresponding device actions. For example, a device may be configured to detect selection of a contact displayed by the device and track additional inputs, such as inputs to initiate a call, send a message, read messages, etc. Activity for each element may be based on application tracking, such as detecting use (e.g., duration, times accessed, etc.) and inputs with respect to one or more applications. According to one embodiment, list elements can relate to one or more of a contact, application, social media profile, media title, image data, and website. In that fashion, the selectable display element can be presented and/or formatted for one or more presentation formats of a device.

At block 210, a display format is determined for a selectable display element. In one embodiment, the format for the selectable display element is configured for presentation associated with the plurality of display elements. By way of example, a device is configured to determine the amount of graphical elements and/or presentation of graphical elements for a selectable display element based on elements for a particular listing or presentation format. For contacts, the format may be based on the total number of contacts, the number of contacts associated with each reference character/listing element, and the activity associated with each element. To optimize screen size, elements of the selectable display element may be representative of all elements associated with a particular range. By way of example, having multiple contacts, such as greater than ten, within the range of list elements A through B for contacts can result in presentation of five bar elements. The presentation of bar elements is thus representative of elements with the highest activity within the range A through B and allows for the amount of display area to be limited for presentation of the selectable display area in the same range.

In one embodiment, the selectable display element includes a plurality of graphical elements identifying by at least one of shape, size, color, and appearance activity for the plurality of list elements. In an exemplary embodiment, the selectable display element includes a series of bar elements (see FIG. 4A) wherein each bar represents a single element between a listing range displayed. In other embodiments, the selectable display element includes a line segment and/or profiles shape (see FIG. 4B). In one embodiment, the display format for the selectable display element defines a graphical segment identifying list elements with greater activity by increased dimension and area relative to list elements with lesser activity by decrease dimension and area. Thus, bar elements of smaller or reduced portions relate to lower levels of activity relative to bar elements of greater size. Similarly peaks correspond to high activity with troughs of the selectable display element relating to lower activity.

In one embodiment, the display format for the selectable display element defines a scrollable element presented in association with a scrolling direction of the plurality of list elements. By way of example, the selectable display element may be presented to aid in selection, navigation and/or browsing of a series of elements. As such, the selectable display element can be presented in conjunction with, or in addition to, a display format for presentation of elements.

At block 215, the selectable display element is presented. According to one embodiment, the presentation format for a selectable display element is determined for a full range or list of elements. However, due to screen size the device may only display a portion of an element listing. Accordingly, a portion of the selectable display element can be presented on the display of the device. In one embodiment, at least one list element is presented in association with the portion of the selectable display element.

Display format at block 215 may be based activity associated with elements and based on factors tracked by a controller (e.g., location of the device, time of day, etc.). According to another embodiment, the display format at block 215 can be presented with one or more graphical configurations, such as a line segment, profile shape, series of bar elements, etc. The selectable display element may be presented as an activity graphic or heat map with one or more colors. The presentation may be a static presentation or animated presentation to feature one or more of color changes, pulsating display, movement, etc.

Process 200 may also include updating presentation of the selectable display element at block 220. In one embodiment, the device detects a selection of the selectable display element and updates the presentation of the selectable display element based on the selection.

In one embodiment, updating at block 220 includes detecting a selection of the selectable display element and controlling a function of the device based on the selection and a list element associated with the selection. By way of example, the device may detect a selection of a portion of the selectable display element, such as an individual bar element, peak, trough, etc., and then update the display to present graphical elements based on the selection. In one embodiment, when a bar element is selected, the element associated with the selected bar element is navigated to or selected. When a portion of segment is selected, such as a peak, elements associated with the peak may be presented or previewed for further selection and/or interaction.

In one embodiment, updating at block 220 includes detecting activity with one or more of the plurality of list elements and updating the display format for the selectable display element. By way of example, for a contact element, activity such as unread messages, incoming communications, or activity in general can result in the selectable display element being modified during display to signal the activity.

In one embodiment, block 220 includes determining index elements for the plurality of list elements and presenting the selectable display element to include at least a portion of the index elements. Index elements can include be based on an alphabetical listing, numerical listing, category descriptions, application type, etc.

Figure 3:
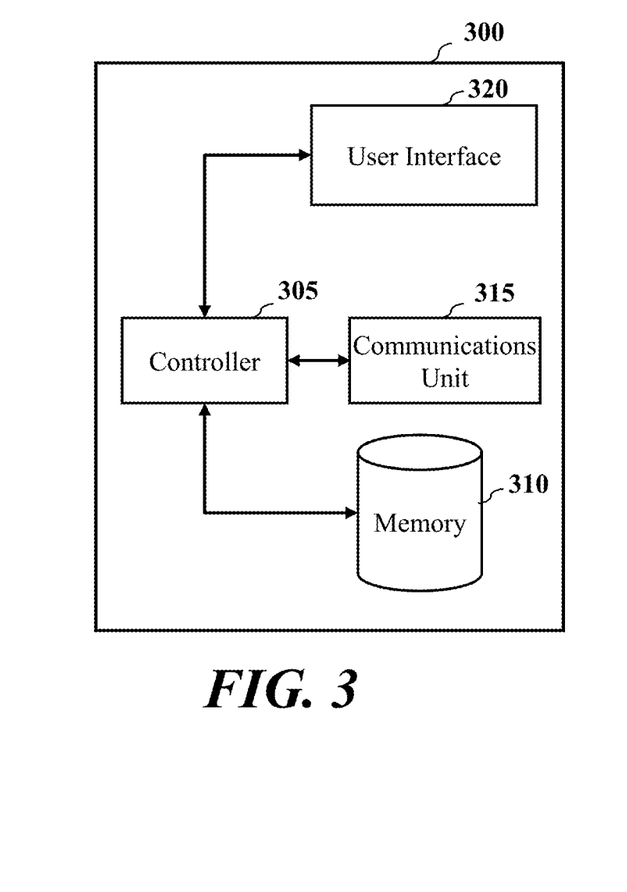
FIG. 3 depicts a simplified diagram of a device according to one or more embodiments.

FIG. 3 depicts a simplified diagram of a device according to one or more embodiments. Device 300 may relate to one or more devices for presenting a user interface including a selectable display element. As shown in FIG. 3, device 300 includes controller 305, memory 310, communications unit 315 and user interface 320. Controller 305 may be configured to execute code stored in memory 310 for operation of device 300 including presentation of a selectable display element. According to one embodiment, controller 305 includes a processor and/or one or more processing elements. In one embodiment, controller 305 includes one or more of hardware, software, firmware and/or processing components in general. According to one embodiment, controller 305 is configured to perform one or more processes described herein. Communications unit 315 is configured for wired and/or wireless communication with one or more network elements, such as servers. Memory 310 can include non-transitory RAM and/or ROM memory for storing executable instructions, operating instructions and content for display. User interface 320 can include one or more input/output interfaces for control and/or communication. In certain embodiments, device 300 relates to a device including a display as part of user interface 320, such as a mobile device, or device having a display in general. User interface 320 includes a touch screen display in some embodiments.

Figure 4A:
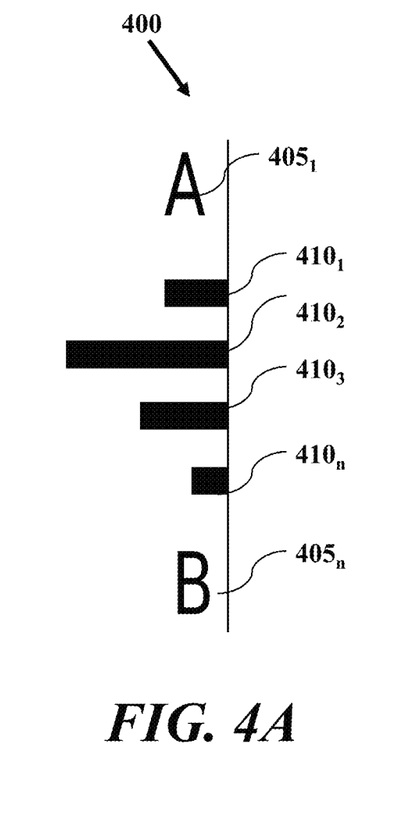
FIG. 4A depicts a graphical representation of a selectable display element according to one or more embodiments.

FIG. 4A depicts a graphical representation of a selectable display element according to one or more embodiments. According to one embodiment, a selectable display element 400 (e.g., selectable display element 115) is presented to include reference elements $405_{1-n}$ (e.g., reference elements $120_{1-n}$) and bar elements $410_{1-n}$ (e.g., bar elements $125_{1-n}$. According to one embodiment, the number of bar elements $410_{1-n}$ presented between each of the reference elements $405_{1-n}$ correlates to the number of elements selectable/actionable (e.g., elements $110_{1-n}$) between the reference elements $405_{1-n}$. In one embodiment, the device may be configured to determine the type of reference elements $405_{1-n}$, such as alphabetical, numerical, most recently used, time period of use, etc. Based on categorization by the device and activity detected by the device, a format may be determined for bar elements $410_{1-n}$. According to one embodiment, elements with a higher activity ranking include a larger bar element, such as bar element $410_2$, relative to the other bar elements. In certain embodiments, the device may scale the presentation size of bar elements $410_{1-n}$ based on display area available, the number of elements, and the type of listing presented.

Figure 4B:
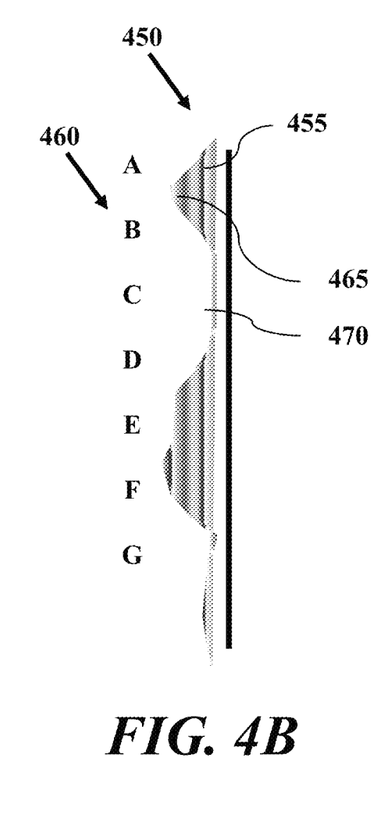
FIG. 4B depicts a graphical representation of a selectable display element according to one or more embodiments.

FIG. 4B depicts a graphical representation of a selectable display element according to one or more embodiments. According to one embodiment, a selectable display element 450 (e.g., selectable display element 115) is presented as a shape element 455 including at least one of a segment line and display fill. Selectable display element 450 can include reference elements 460 (e.g., reference elements $120_{1-n}$). According to one embodiment, the presentation format of selectable display element 450 includes one or more peaks 465 and valleys 470, wherein peaks 460 represent elements with the highest activity and/or use. According to one embodiment, shape element 455 may be scrolled and/or selectable. When shape element 455 is selected, the device is configured to update a display to present an element based on the selection and/or provide additional information based on the interaction with shape element 455.

Figure 5:
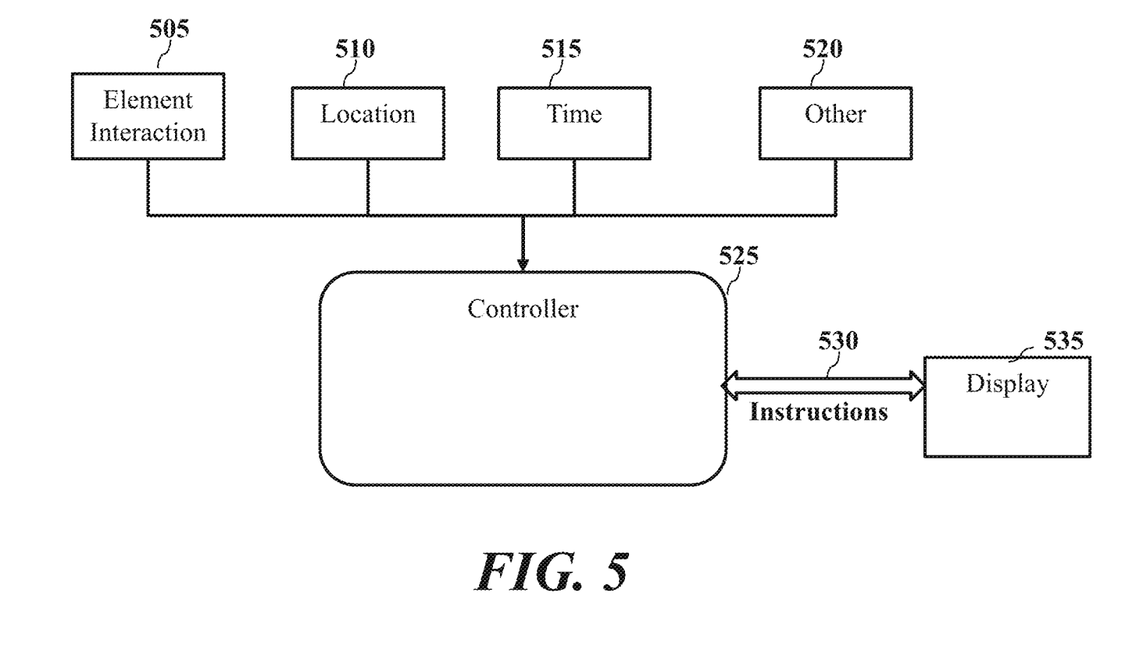
FIG. 5 depicts a graphical representation of device operation according to one or more embodiments.

FIG. 5 depicts a graphical representation of device operation according to one or more embodiments. According to one embodiment, formatting of a selectable display element may be based on one or more factors. Moreover, the presentation format of the selectable display element may be modified based on factors other than activity. By way of example, in certain embodiments, a selectable display element (e.g., selectable display element 400) may be updated based on location of the device, even if the activity with respect to particular elements (e.g., contacts, list elements, etc.) has not initiated the change in display format. With contacts (e.g., mobile device contacts, electronic contact files, etc.), the selectable display element may update the presentation based on a detected location and time, such that contacts that are typically called in time of day matching a current time and the location will be presented with a higher/larger display representation. According to one embodiment, a device (e.g., device 100) can detect and track element interaction 505, location 510, time 515 and other factors 520 that may be detected by controller 525.

Controller 525 is configured to track element interaction 505 based on selections of a device such as selection of a contact for communication purposes, the number of messages transmitted and received with a contact, the duration of communication sessions, the frequency of communication with a contact, and period of time since last interaction. Controller 525 can receive location 510 to match the activity with an element with the location of a device. By way of example, when elements are frequently accessed or used with a particular location (e.g., work, home, etc.), controller 525 may present a selectable display element that is formatted based on the location of the device such that elements (e.g., contacts, applications, etc.) that are relevant to the location are identified in the display.

In certain embodiments, controller 525 tracks time 515 related to the time of day, such that elements with high activities for the current time or a time period associated with the current time (e.g., morning, mid-day, afternoon, etc.) are accounted for in the presentation of the selectable display element. Controller 525 may track other forms of data 520 associated with elements, such as element metadata, changes to an element, and even device characteristics such as display size.

According to one embodiment, a controller 525 is configured to determine the presentation format for a selectable display element and output instructions 530 to display 535 of the device for presentation of the selectable display element.

While this disclosure has been particularly shown and described with references to exemplary embodiments thereof, it will be understood by those skilled in the art that various changes in form and details may be made therein without departing from the scope of the claimed embodiments.

What is claimed is:

1. A method for device control including presentation of a selectable display element, the method comprising:

determining, by a device, activity for each of a plurality of elements in a list, wherein the plurality of elements of the list includes at least one of contact, application, social media profile, media title, image data, and website of the device;

determining, by the device, a display format for a selectable display element based on activity determined for each of the plurality of elements of the list, wherein the selectable display element is configured for presentation associated with the plurality of elements of the list; and presenting, on a screen of the device, a user interface including a plurality of elements of the list along with one or more portion of the selectable display element based on the display format determined on the activity for each of the plurality of elements of the list, wherein elements of the list are presented in association with at least a portion of the selectable display element, the portion of selectable display element includes a plurality of reference elements and each reference element is displayed with one or more visual elements, wherein the reference element is a reference character for categorizing and arranging elements of the list, the one or more visual elements associated with the reference element have a dimension to represent amount of activity determined with respect to all elements of the list associated with the reference element, and an amount of the one or more visual elements is determined based on elements for a particular listing or presentation format for at least one of a contact, application, social media profile, media title, image data, and website of the device; and presenting, on the screen of the device, a magnified window on the user interface that includes elements of the list along with at least a portion of the selectable display element, wherein the magnified window includes an enlarged reference character and one or more visual elements based on a location associated with user input of the selectable display element for greater detail or control of a selected visual element that can result in a selection of an element associated with the selected visual element.

2. The method of claim 1, wherein the activity for each of the plurality of elements of the list is determined based on at least one of number of times accessed, duration of use, and interaction with each of the plurality of list elements.

3. The method of claim 1, wherein the selectable display element includes a plurality of graphical elements identifying by at least one of shape, size, color, and appearance activity for the plurality of list elements.

4. The method of claim 1, wherein the display format for the portion of the selectable display element defines a graphical segment identifying elements of the list with greater activity by increased dimension and area relative to elements of the list with lesser activity by decrease dimension and area.

5. The method of claim 1, wherein the display format for the selectable display element defines a scrollable element presented in association with a scrolling direction of the plurality of elements of the list.

6. The method of claim 1, further comprising detecting a selection of the selectable display element and updating the presentation of the selectable display element based on the selection.

7. The method of claim 1, further comprising detecting a selection of the selectable display element and controlling a function of the device based on the selection and an element of the plurality of elements of the list associated with the selection.

8. The method of claim 1, further comprising detecting activity with one or more of the plurality of elements of the list and updating the display format for the selectable display element based on activity of one or more elements of the list.

9. The method of claim 1, further comprising determining index elements for the plurality of elements of the list and presenting the selectable display element to include at least a portion of the index elements.

10. A device comprising:
a display,
a memory; and
a controller coupled to the display and the memory, the controller configured to determine activity for each of a plurality of elements in a list, wherein the plurality of elements of the list includes at least one of contact, application, social media profile, media title, image data, and website of the device;

determine a display format for a selectable display element based on activity determined for each of the plurality of elements of the list, wherein the selectable display element is configured for presentation associated with the plurality of display elements of the list; and present a user interface including a plurality of elements of the list along with one or more portions of the selectable display element based on the display format determined on the activity for each of the plurality of elements of the list, wherein elements of the list are presented in association with at least a portion of the selectable display element, the portion of selectable display element includes a plurality of reference elements and each reference elements is displayed with one or more visual elements, wherein the reference element is a reference character for categorizing and arranging elements of the list, the one or more visual elements associated with the reference element have a dimension to represent amount of activity determined with respect to all elements of the list associated with the reference element, and an amount of the one or more visual elements is determined based on elements for a particular listing or presentation format for at least one of a contact, application, social media profile, media title, image data, and website of the device; and present a magnified window on the user interface that includes elements of the list along with at least a portion of the selectable display element, wherein the magnified window includes an enlarged reference character and one or more visual elements based on a location associated with user input of the selectable display element for greater detail or control of a selected visual element that can result in a selection of an element associated with the selected visual element.

11. The device of claim 10, wherein the activity for each of the plurality of elements of the list is determined based on at least one of number of times accessed, duration of use, and interaction with each of the plurality of list elements.

12. The device of claim 10, wherein the selectable display element includes a plurality of graphical elements identifying by at least one of shape, size, color, and appearance activity for the plurality of list elements.

13. The device of claim 10, wherein the display format for the portion of the selectable display element defines a graphical segment identifying elements of the list with greater activity by increased dimension and area relative to elements of the list with lesser activity by decrease dimension and area.

14. The device of claim 10, wherein the display format for the selectable display element defines a scrollable element presented in association with a scrolling direction of the plurality of elements of the list.

15. The device of claim 10, further comprising detecting a selection of the selectable display element and updating the presentation of the selectable display element based on the selection.

16. The device of claim 10, further comprising detecting a selection of the selectable display element and controlling a function of the device based on the selection and an element of the plurality of elements of the list associated with the selection.

17. The device of claim 10, further comprising detecting activity with one or more of the plurality of elements of the list and updating the display format for the selectable display element based on activity of one or more elements of the list.

18. The device of claim 10, further comprising determining index elements for the plurality of elements of the list and presenting the selectable display element to include at least a portion of the index elements.

* * * * *